United States Patent [19]
Dulat et al.

[11] Patent Number: 5,779,187
[45] Date of Patent: Jul. 14, 1998

[54] SEEKER HEAD FOR TARGET-TRACKING MISSILES OR PROJECTILES

[75] Inventors: Bernd Dulat, Überlingen; Wolfgang Eger, Aach-Linz, both of Germany

[73] Assignee: Bodenseewerk Geratetechnik GmbH, Überlingen/Bodensee, Germany

[21] Appl. No.: 798,537

[22] Filed: Feb. 10, 1997

[30] Foreign Application Priority Data

Mar. 23, 1996 [DE] Germany .................. 196 11 595.7

[51] Int. Cl.⁶ .................. F41G 7/00; G02B 26/08
[52] U.S. Cl. .................. 244/3.16; 359/226
[58] Field of Search .................. 244/3.16, 3.15, 244/3.17; 359/220, 221, 226

[56] References Cited

U.S. PATENT DOCUMENTS

| | | | |
|---|---|---|---|
| 4,277,039 | 7/1981 | Blanning et al. | 244/3.16 |
| 4,286,760 | 9/1981 | Couderc et al. | 244/3.16 |
| 4,339,097 | 7/1982 | Kordulla et al. | 244/3.16 |
| 4,436,260 | 3/1984 | Donelan | 244/3.16 |
| 4,773,754 | 9/1988 | Eisele | 244/3.16 |
| 4,790,493 | 12/1988 | Schwarzkopf et al. | 244/3.21 |
| 4,917,330 | 4/1990 | Dulat et al. | 244/3.16 |
| 4,949,917 | 8/1990 | Cottle, Jr. et al. | 244/3.16 |
| 4,965,453 | 10/1990 | Hoschette et al. | 244/3.16 |
| 5,077,465 | 12/1991 | Wagner et al. | 244/3.16 |
| 5,127,604 | 7/1992 | Klaus, Jr. et al. | 244/3.16 |

FOREIGN PATENT DOCUMENTS

| | | |
|---|---|---|
| 0 263 998 A2 | 4/1988 | European Pat. Off. . |
| 0 263 998 A3 | 4/1988 | European Pat. Off. . |
| 0 263 998 B1 | 4/1988 | European Pat. Off. . |
| 3345601 A1 | 6/1985 | Germany . |
| 3441921 A1 | 5/1986 | Germany . |

*Primary Examiner*—Charles T. Jordan
*Assistant Examiner*—Theresa M. Wesson
*Attorney, Agent, or Firm*—McDermott, Will & Emery

[57] ABSTRACT

In a seeker head for target tracking missiles or projectiles, an imaging optical system with an optical axis is mounted on a rotor. The rotor is mounted for universal swivelling motion in the missile. It rotates about its geometrical axis. Thereby, the rotor is stabilized in inertial space as a gyro. The optical system images an object scene on a circular array of detector elements. The rotor can be caused to make controlled precession and nutation movements by control loops with attitude pick-offs and a torquer coil such that the optical axis of the optical system makes a cyclic spiral movement over an extended field of view, in a seeking and target acquisition mode, is then precessed towards a detected target, the nutation amplitude, in a pre-phase mode, being made equal to the target deviation, and, eventually, in a target-tracking mode, makes a circling movement within a limited area in the field of view containing the target. In the target-tracking mode, the target image circles on the circular array of detector elements.

4 Claims, 6 Drawing Sheets

SEEKER HEAD FOR TARGET-TRACKING MISSILES OR PROJECTILES

TECHNICAL FIELD

The invention relates to a seeker head for target tracking missiles or projectiles, comprising: an imaging optical system with an optical axis; a rotor defining a geomerical axis, said imaging optical system being mounted on said rotor; mounting means being provided for mounting said rotor for universal swivelling movement in said missile or projectile, said rotor rotating about said geometrical axis, whereby said rotor is stabilized in inertial space and is de-coupled from the angular movements of the missile; detector means for providing detector signals; said imaging optical system being arranged to image an object scene on said detector means; attitude pick-off means for detecting the angular orientation of said rotor and for providing signals indicative of said orientation, torque generating means for exerting torques on said rotor and control loop means including said torque generating means, signals from said attitude pick-off means and detector signals are applied for causing said optical axis of said optical system to carry out a cyclic movement over an extended field of view during a seeking and catching mode, to be precessed towards a target recognized within said field of view, if a target image is generated on said detector means, and, after the target has been caught, to carry out a circling movement within a limited area of said field of view containing said target, in a target-tracking mode.

At first, a rather large field of view is scanned with a spiral scan. This has the purpose, to seek and catch a target, such as an aircraft to be attacked. This is the "seeking and catching mode". If a target has been detected in the large field of view, the seeker head is aligned with this target. The field of view is narrowed to prevent the target tracking to be disturbed by other, disturbing targets. It is necessary to keep the rotor with the optical system and the narrowed field of view permanently aligned with the thus acquired target. This is the "target-tracking mode".

BACKGROUND ART

Such a seeker head is known from U.S. Pat. No. 4,277,039. In this prior art seeker head, a rotor is gimbal-mounted by means of a central gimbal system An imaging optical system with an optical axis, which coincides with the geometrical axis of the rotor, is mounted on the rotor. An object scene is imaged by the imaging optical system on an image plane, in which a single detector responding to the observed radiation is located. When the rotor is swivelled with the imaging optical system, the area of the object scene detected by the detector is varied.

The rotor is driven about its geometrical axis. To this end, the rotor is rotatably mounted through anti-friction bearings on an inner gimbal. The rotor rotates and represents a gyro, which can be universally swivelled about the center of the gimbal system. Thereby, the rotor with the optical system is stabilized in inertial space and is de-coupled from the angular motions of the missile. Torque generating means generate torques on the rotor about a pitch axis and about a yaw axis. The attitude of the rotor relative to the missile or projectile is picked off by pitch and yaw pick-offs. On one hand, signals are applied to the torque generating means to generate a controlled nutation movement. To this end, control loops are provided in which certain commanded nutation movements are compared with the actual nutation movements of the rotor as measured by the pick-offs, and the torque generating means are energized correspondingly. By this controlled nutation movement of the rotor, the object scene is scanned. U.S. Pat. No. 4,277,039 mentions a spiral scan of the object scene. Furthermore, the appropriately processed signal of the detector is applied to the torque generating means such that a torque is exerted on the rotor to precess the rotor with the optical axis towards the target. Thus, if a spiral scan is effected by the nutation and, a target is detected in a seeking and catching mode, then the rotor is precessed into a position in which the target is located in the center of the scanning spiral generated by the superimposed scanning movement.

U.S. Pat. No. 4,277,039 also provides that the nutation movement can be changed over depending on the mode (seeking or target-tracking mode). In the target-tracking mode, a circle is generated as nutation pattern, the target being retained in the center of this circle.

In U.S. Pat. No. 4,277,039, torques for generating the desired precession or nutation movements are exerted on the rotor by means of an ring coil which is coaxial with the longitudinal axis of the missile or projectile and surrounds the rotor. The rotor is radially magnetized. Torques either about the pitch axis or about the yaw axis are generated by applying to this coil a.c.-signals which have one or the other of two phases offset by 90°.

The signals for generating precession torques serve, at the same time, for generating steering signals.

European patent 0,263,998 and cognate U.S. Pat. No. 4,790,493 describe a device in a missile for measuring the roll rate of the missile. To this end, a free gyro arranged in the seeker head is excited to nutation movements. From the measured rotational frequency and the also measured nutation frequency of the free gyro, the roll rate can be determined.

German patent 3,441,921 relates to a guide beam and follow-up device for controlling a high-speed projectile, in particular a guided shell. A guide beam laser is deflected in a spiral way.

German patent application 3,345,601 describes a submunition body which makes a wobbling motion for generating a circular scanning movement.

DISCLOSURE OF THE INVENTION

With high-speed missiles or projectiles, the object scene has to be scanned very quickly for target acquisition. With a spiral scan, the spiral has to be traversed very quickly. The nutation frequency is dependent on the rotation frequency through the inertial momenta of the rotor (See European patent 0,263,998). It has, however, to be ensured that a target is safely detected by the spiral scan, thus does not fall between two spiral loops.

In the target-tracking mode, the seeker head has to react still faster, in order to keep the target in the center of the field of view of the optical system. In this mode, the missile is steered in accordance with the law of proportional navigation. This means that the vector of the line of sight from the missile or projectile to the target is kept fixed in space. To this end, control signals are applied to the steering system of the missile or projectile, which are proportional to the angular rate of the line of sight vector in inertial space. According to the gyro laws, this angular rate is proportional to the torques exerted on the rotor, if the geometrical axis of the rotor and the optical axis of the optical system always remain aligned with the target by means of the control loop. Thus it is important to control and to correct, if necessary, this alignment at a high rate.

It is the object of the invention to design a seeker head of the type mentioned in the beginning such that, in the target-tracking mode, any deviation of the target from the optical axis is detected very quickly, at high sampling rate.

According to the invention, this object is achieved by change-over means for changing said torque generating means over to a pre-phase mode, when a target has been detected in said seeking and catching mode, said rotor, in said pre-phase mode, being caused to nutate with a nutation amplitude which substantially is equal to the deviation of said target from said optical axis, said nutation amplitude continuously decaying when said optical axis is precessed towards said target, the target image sweeping, during each cycle of said nutation, across a circular array of detector elements, and for changing said torque generating means over to said target-tracking mode, when a minimum value of said nutation amplitude substantially equal to the diameter of the circular array of detector elements has been reached.

If, reversely, the "back-projected" image of the circular array of detector elements in the object scene is regarded, then the target lies on this circular array. The circular array makes a circling movement around the target, while retaining its orientation. The back-projected images of the detector elements of the circular array pass consecutively, one after the other, through the target. In the target-tracking mode, the amplitude of the nutation movement is selected accordingly. Thereby, the target is sampled at a multiple of the nutation frequency, namely the nutation frequency multiplied by the number of detector elements of the circular array. Thereby, deviations of the target from the optical axis can be detected very quickly and can be corrected.

The, scanning of the field of view in the seeking and catching mode is effected in such a way that the optical axis of the optical system makes a cyclic, spiral movement in the seeking and catching mode. By using a circular array of detector elements, the field of view can be scanned with comparatively few spiral revolutions without the risk of the target lying between neighboring spiral loops and thus being missed. The target is safely detected by at least one of the detector elements of the circular array.

If a target is detected in the seeking and catching the rotor with the optical axis of the optical system mode, is precessed towards the target by the follow-up signals is applied to the torque generating means. With this follow-up process, the target should be detected by the detector elements repeatedly and in quick sequence, for the follow-up signals are derived from the signals of the detector elements.

Further modifications of the invention are subject matter of claims 4 to 6.

An embodiment of the invention is described hereinbelow with reference to the accompanying drawings.

PREFERRED EMBODIMENT OF THE INVENTION

Figure 1:
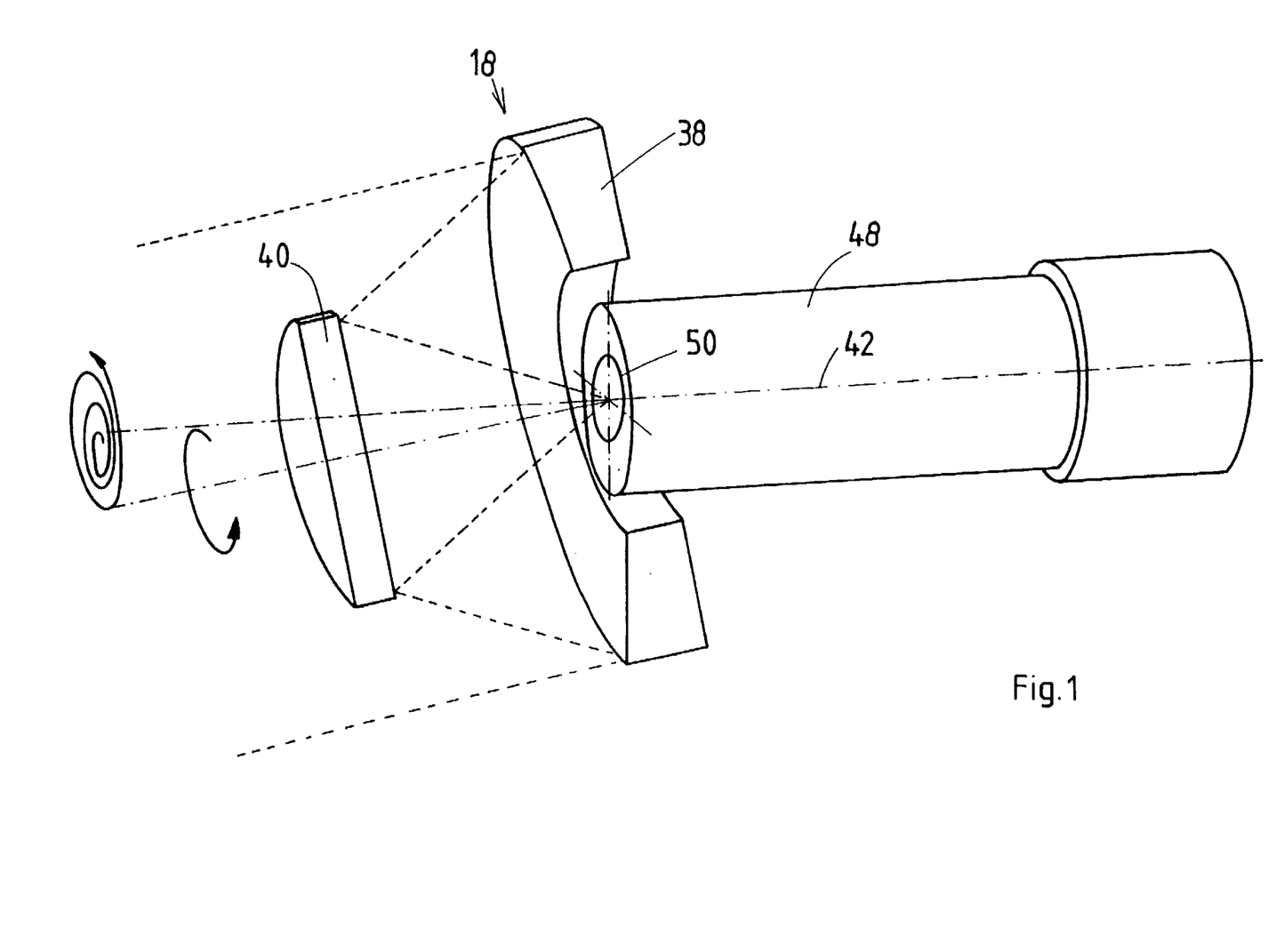
FIG. 1 is a schematic-perspective illustration of a seeker head for a missile or a projectile.

Referring to FIG. 1, numeral 10 designates a missile or a steerable projectile. The missile or projectile 10 has a seeker head 12. The seeker head of the missile or projectile is located in the tip of the missile or projectile behind a "dome" (not shown), i.e. a convex window closing the missile or projectile at its tip. The seeker head has a rotor 16. The rotor 16 carries an imaging optical system 18. The rotor 16 is mounted, with a spherical outer surface 20, for universal swivelling movement in an air bearing 22. The rotor is driven by pressurized gas.

Figure 2:
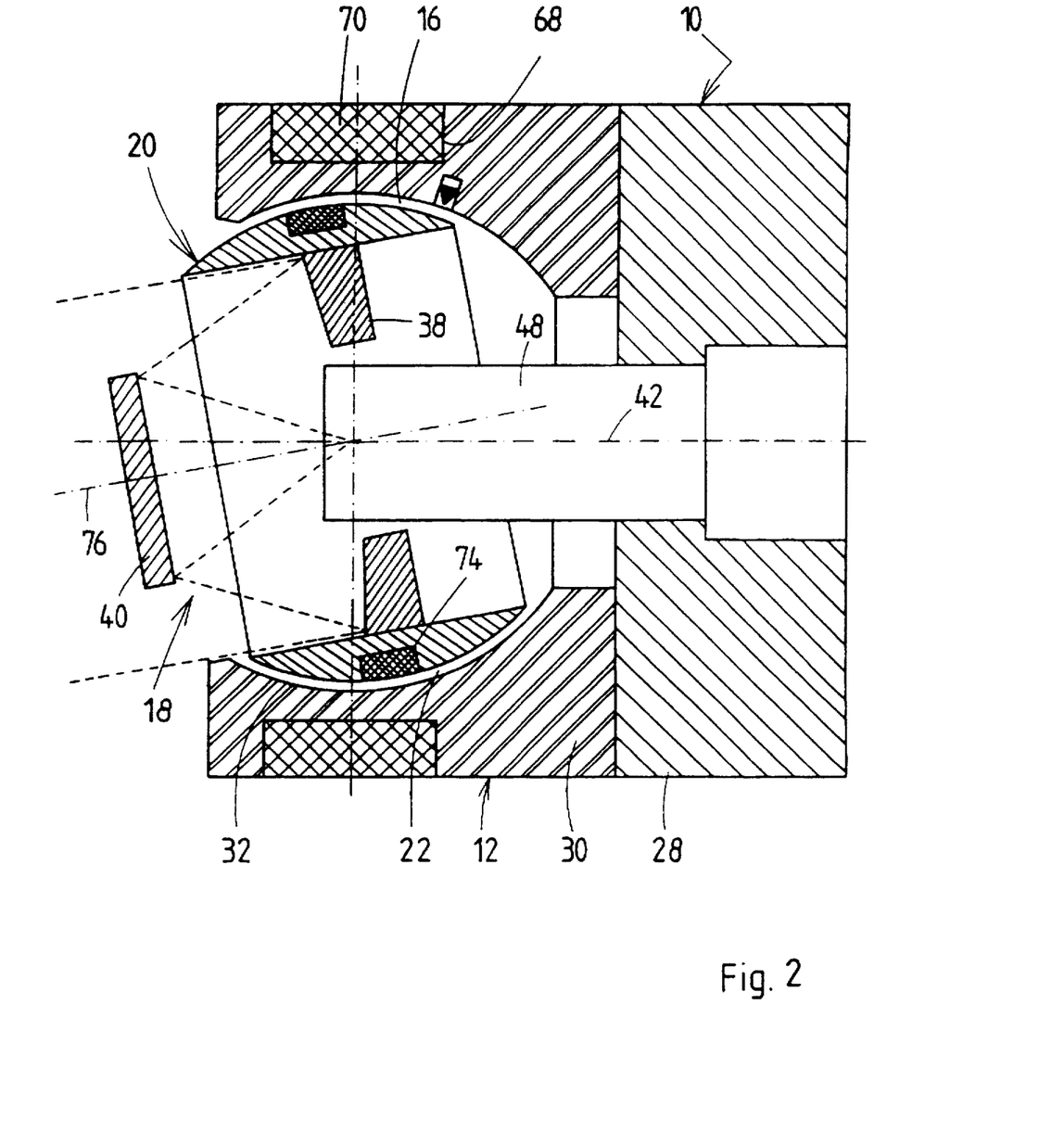
FIG. 2 is a longitudinal sectional view of the seeker head.

The seeker head 12 has a missile-fixed socket 28. A bearing body 30 is mounted on the socket 28. The bearing body defines the concave-spherical bearing surface 32 of the air bearing 22.

The rotor 16 is mounted in the concave-spherical bearing surface 32. The rotor is tubular with the convex-sperical outer surface 20. A narrow air gap is defined between the concave-spherical bearing surface 22 and the convex-spherical outer surface 20 of the rotor 16. Pressurized gas is blown into this air gap. Thereby, the outer surface 22 of the rotor 16 is lifted from the bearing surface 22. The rotor 16 is supported on the gas layer virtually without friction. The rotor 16 is mounted for universal swivelling movement about the common center of the spherical surfaces 20 and 22.

Figure 6:
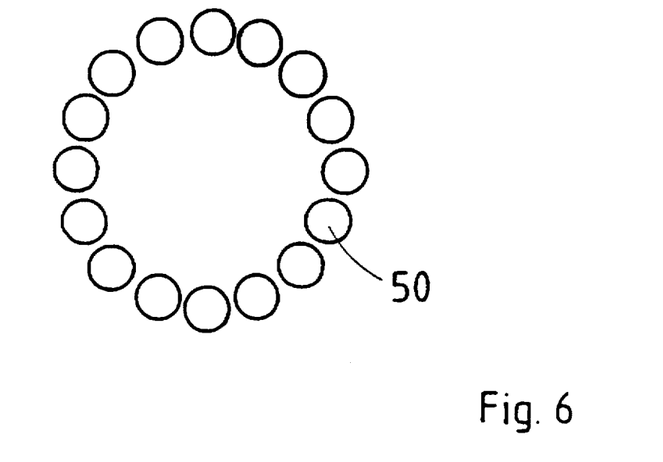
FIG. 6 shows the circular array of detector elements.

The rotor 16 carries the optical system 18. The optical system 18 consists of an annular concave mirror 38 and a secondary mirror 40. The concave mirror 38 is mounted in the bore of the tubular rotor 16. The concave mirror 38 faces the dome and the object scene. The secondary mirror is supported on the concave mirror 38 and the rotor 16 through posts and faces the concave mirror. A detector carrier 48 with a cooler 48 is mounted centrally and missile-fixed on the socket 28. A circular array of sixteen detector elements 50 (FIG. 6) is mounted on the detector carrier 48.

The bearing body 30 defines a circumferential groove 68. An ring coil 70 is retained in this circumferential groove 68. The ring coil 70 surrounds the rotor 16 and is coaxial with the longitudinal axis 42 of the missile or projectile. The rotor 16 contains a radially magnetized ring 74. The radially magnetized ring 74 cooperates with the ring coil 70 to generate torques. To this end, a.c.-signals having the rotary frequency of the rotor 16 are applied to the ring coil 70. The phase of these a.c.-signals determines, whether a torque about the pitch axis or about the yaw axis of the missile or projectile is to be generated. These signals permit precession of the rotor 16 to be initiated, by which the optical axis 76 of the optical system 18 is caused to point to the target. It is, however, also possible to apply signals at the nutation frequency of the rotor 16. These signals then excite a nutation movement of the rotor 16. Feedback signals from attitude pick-offs ensure that the nutation movement follows, in a controlled way, a selected pattern, as indicated in FIG. 1.

Figure 3:
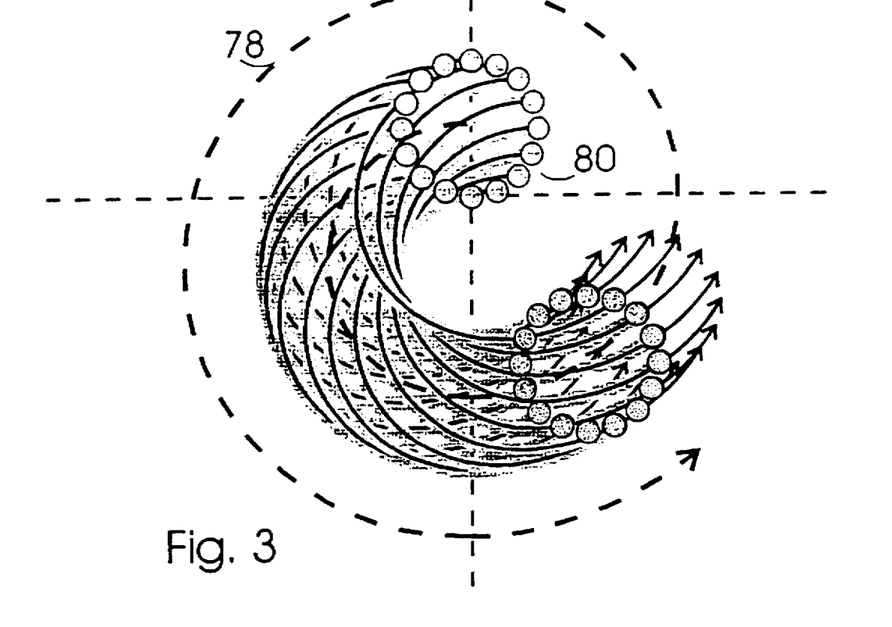
FIG. 3 is a simplified, schematic illustration and demonstrates the scanning of the object scene in the seeking and acquisition mode during the inital phase of a scanning cycle.

FIG. 3 illustrates the scanning of an extended field of view by the seeker head 12 described above. A nutation movement is imparted to the rotor 16, such that the optical axis 76 of the optical system 18 describes a scanning spiral. FIG. 3 illustrates the "back-projection" 80 of the circular array of detector elements 50 on the object scene. The "images" of the detector elements, thus the areas from which the optical system 18 focusses radiation on the individual detector elements 50, move over the object scene. It will be recognized that, during the spiral scan, the points of the object scene are detected by the various detector elements 50 virtually without a gap. Therefore, the distance of the individual spiral loops can be selected rather large, whereby the spiral is traversed quickly. The spiral scan is repeated cyclically. This is the seeking and target catching mode. Each point of the field of view is detected once during the traverse of the whole spiral path, i.e. at a frequency which is a fraction of the nutation frequency.

Figure 4:
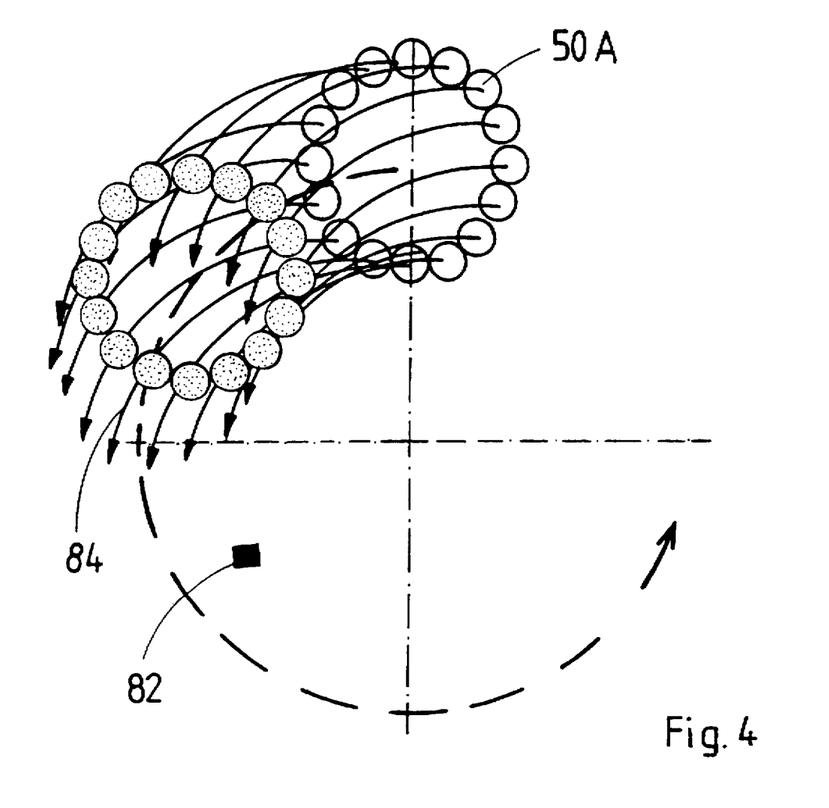
FIG. 4 is a simplified, schematic illustration and demonstrates the scanning of the target in the "pre-phase" mode, while the optical axis of the optical system is caused to move towards the target.

If a target is detected within the field of view, then, in addition to the spiral nutation movement, also a precession movement of the rotor 16 is initiated through the ring coil 70, whereby the optical axis 76 is precessed towards the target. During this follow-up procedure, the target ought to be detected by the detector element in rapid succession, for the follow-up signals are derived from the signals of the detector elements 50. If, therefore, a target is detected in the seeking and target catching mode, the energization of the torque generating means is changed over to a pre-phase mode, in which the nutation amplitude is substantially equal to the respective target deviation from the optical axis. This target deviation and, thereby, the nutation amplitude is continuously reduced by the follow-up movement of the optical axis towards the target. Thereby, the target image, during each nutation revolution, sweeps over the circular array of detector elements. This is illustrated in FIG. 4. In FIG. 4, numeral 82 designates the target. Numeral 50A designates the back-projections of the detector elements onto the field of view. These are those spots of the field of view from which spots radiation is directed onto the various detector elements 50. These back-projections make a circling movement while retaining the orientation of the circular array. The back-projections of the detector elements move along the trajectories 84 in FIG. 4. When a minimum value of the nutation amplitude which is substantially equal to the diameter of the circular array, the seeker head is changed over to a target-tracking mode.

Figure 5:
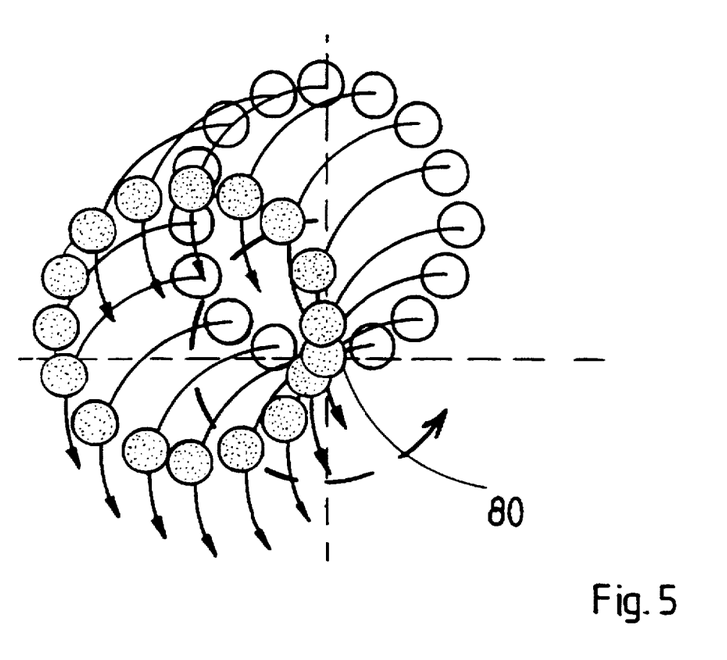
FIG. 5 is an illustration similar to FIG. 4 and demonstrates the relative movement of target image and detector elements (or of target and back-projection of the detector elements into the field of view), in the target-tracking mode.
Figure 7:
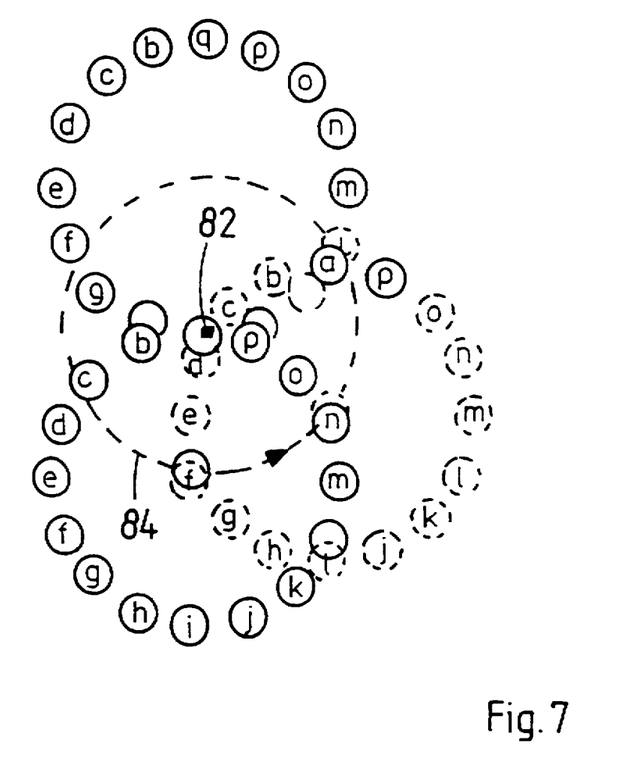
FIG. 7 is another kind of illustration, which shows the relative movements of target image and detector elements, or of the target and the back-projection of the detector elements into the field of view, in the target-tracking mode.

The target-tracking mode is illustrated in FIGS. 5 and 7. Also these Figures show "back-projections" of the detector elements 50 by the optical system 18 on the object scene. Referenced to the missile or projectile, the detector elements 50 are stationary, and the image of the object scene generated by the optical system 18 in the plane of the detector elements 50 makes a circling movement, when the rotor 16 makes a nutation movement.

Now there is only a movement about the center of the scanning spiral 78. During this circling movement, the orientation of the circular array of back-projected images of the detector elements 50 relative to the object scene (or of the circling image of the object scene relative to the missile-fixed circular array of detector elements) remains unchanged. This can be gathered from the letters alotted to the individual detector elements 50 in FIG. 7. Therefore, the detector elements 50 are consecutively exposed to the target radiation. Relative to the missile or projectile 10 and the missile- or projectile-fixed circular array of detector elements 50, the amplitude of the nutation movement is selected such that the image of the target together with the image of the object scene makes a circling movement with the diameter of the circular array of the detector elements 50. If the seeker head properly points to the target, the image of the target will successively sweep over the individual detector elements 50.

In FIG. 7, numeral 82 designates a target. In FIG. 7, the image of the circular array of the detector elements 50 back-projected into the object scene by the optical system 18 is illustrated in three phases of the nutation movement. The center of the circular array circles along a circular trajectory 84 around the target 82. The diameter of the trajectory 84 is equal to the diameter of the circular array of detector elements 50 as back-projected into the object scene. The orientation of the circular array is maintained during the circling movement. The target 82 overlaps successively the images of the different detector elements 50. In the three nutation positions of FIG. 7, the target successively overlaps the images of the detector elements "a", "d" and "i", i.e. is the target detected by the respective one of these detector elements.

Therefore, the position of the target in the field of view of the seeker head is sampled at a frequency which is equal to the nutation frequency multiplied by the number of detector elements 50 of the circular array. Deviations are ascertained very quickly. They result, at first, in the rotor 16 following the target. The signals required therefor are a measure of the line of sight angular rate and, at the same time, are applied to the steering system.

The missile or projectile may make a roll movement about its longitudinal axis. Often, such roll movement is intentionally imparted to the missile or projectile by its aerodynamic design. In this case, the image of the circular array of detector elements 50 as "back-projected" by the optical system 18 on the object scene, would rotate at the roll rate. Thus the circular array would not maintain its orientation relative to the object scene as in FIG. 7. This roll frequency may, however, determined in accordance with the teaching of European patent 0,263,998 or U.S. Pat. No. 4,790,493 from the rotational frequency (relative to the missile or projectile) and the nutation frequency, and may be taken into account when measuring target deviation.

We claim:

1. A seeker head for a target tracking missile or projectile, comprising:

an imaging optical system with an optical axis;

a rotor defining a geometrical axis, said imaging optical system being mounted on said rotor;

mounting means for mounting said rotor for universal swivelling movement in said missile or projectile, said rotor rotating about said geometrical axis such that said rotor is stabilized in inertial space and is de-coupled from the angular movements of the missile;

detector means in the form of a circular array of detector elements for providing detector signals; said imaging optical system being arranged to image an object scene on said detector means;

attitude pick-off means for detecting the angular orientation of said rotor and for providing signals indicative of said orientation;

torque generating means for exerting torques on said rotor;

control loop means including said torque generating means, wherein signals from said attitude pick-off means and detector signals are applied for causing said optical axis of said optical system to carry out a cyclic, spiral movement over an extended field of view during a seeking and catching mode, to be precessed towards a target recognized within said field of view, if a target image is generated on said detector means, and, after the target has been caught, to carry out a circling movement within a limited area of said field of view containing said target, in a target-tracking mode, said control loop means being controlled, in said target tracking mode, to cause said target image to circle on said circular array of detector elements;

and change-over means for changing said torque generating means over to a pre-phase mode, when a target has been detected in said seeking and catching mode, said rotor, in said pre-phase mode, being caused to nutate with a nutation amplitude which substantially is equal to the deviation of said target from said optical axis, said nutation amplitude continuously decaying when said optical axis is precessed towards said target, the target image sweeping, during each cycle of said nutation, across said circular array of detector elements, and for changing said torque generating means over to said target-tracking mode, when a minimum value of said nutation amplitude substantially equal to the diameter of the circular array of detector elements has been reached.

2. A seeker head as claimed in claim 1, wherein said rotor mounting means comprise air bearing means with a convex-spherical outer surface of said rotor, a concave-spherical bearing surface of said missile or projectile, said surfaces defining an air gap therebetween, and means for injecting air into said air gap.

3. A seeker head as claimed in claim 2, wherein said rotor is tubular with said convex-circular outer surface, said imaging optical system comprises an annular concave mirror facing said object scene and having a central aperture therethrough, said imaging optical system further comprises a secondary mirror facing said concave mirror and supported thereon, said detector elements are mounted on a missile- or projectile-fixed carrier extending into said tubular rotor and through said aperture of said concave mirror.

4. A seeker-head as claimed in claim 1, wherein said torque generating means comprise an ring coil held in said missile or projectile coaxially with the longitudinal axis thereof and surrounding said rotor, said rotor being radially magnetized, said ring coil being energized by said control loop means to exert torques on said rotor for generating controlled nutation movements thereof and to cause said optical axis to precess towards said target.

\* \* \* \* \*